United States Patent
De Jesus

(10) Patent No.: US 12,003,515 B2
(45) Date of Patent: Jun. 4, 2024

(54) SYSTEMS AND METHOD OF CYBER-MONITORING WHICH UTILIZES A KNOWLEDGE DATABASE

(71) Applicant: CYBER DEFENCE QCD CORPORATION, Ottawa (CA)

(72) Inventor: Tiago Alves De Jesus, Ottawa (CA)

(73) Assignee: CYBER DEFENCE QCD CORPORATION, Ottawa (CA)

(*) Notice: Subject to any disclaimer, the term of this patent is extended or adjusted under 35 U.S.C. 154(b) by 675 days.

(21) Appl. No.: 17/259,453

(22) PCT Filed: Jul. 12, 2019

(86) PCT No.: PCT/CA2019/050958
§ 371 (c)(1),
(2) Date: Jan. 11, 2021

(87) PCT Pub. No.: WO2020/010461
PCT Pub. Date: Jan. 16, 2020

(65) Prior Publication Data
US 2021/0281587 A1   Sep. 9, 2021

Related U.S. Application Data

(60) Provisional application No. 62/699,868, filed on Jul. 18, 2018, provisional application No. 62/697,177, filed on Jul. 12, 2018.

(51) Int. Cl.
*H04L 9/40* (2022.01)
*G06F 21/55* (2013.01)
*G06N 5/04* (2023.01)

(52) U.S. Cl.
CPC ...... *H04L 63/1416* (2013.01); *H04L 63/1425* (2013.01); *H04L 63/145* (2013.01); *H04L 63/20* (2013.01)

(58) Field of Classification Search
CPC ............ H04L 63/1416; H04L 63/1425; H04L 63/145; H04L 63/20; G06F 21/552; G06F 21/554; G06N 5/04
See application file for complete search history.

(56) References Cited

U.S. PATENT DOCUMENTS

| 9,401,926 B1 | 7/2016 | Dubow et al. |
| 9,747,446 B1 | 8/2017 | Pidathala et al. |

(Continued)

FOREIGN PATENT DOCUMENTS

| CN | 104519031 A | 4/2015 |
| CN | 106778259 A | 5/2017 |

OTHER PUBLICATIONS

US 9,589,135 B1, 03/2017, Rathor et al. (withdrawn)
International Search Report and Written Opinion dated Sep. 10, 2019 in International Application No. PCT/CA2019/050958.

*Primary Examiner* — Vu V Tran
(74) *Attorney, Agent, or Firm* — McDermott Will & Emery LLP

(57) ABSTRACT

The invention relates to systems and methods of cyber-monitoring which utilizes a knowledge database. In particular, the present invention provides a method of monitoring a cyber-network comprises the following steps: providing one or more database(s) of normally-occurring cyber-event(s); detecting cyber-event(s) in the cyber-network; determining if the detected cyber-event(s) is normally-occurring or anomalous by analyzing the detected cyber-event(s) using the one or more database(s) of normally-occurring cyber-events; excluding cyber-event(s) which are classified as normally-occurring to identify anomalous cyber-events; and optionally determining if the anomalous cyber-events are malicious.

17 Claims, 1 Drawing Sheet

(56) References Cited

U.S. PATENT DOCUMENTS

| | | | |
|---|---|---|---|
| 10,320,813 B1* | 6/2019 | Ahmed | H04L 63/1416 |
| 10,452,841 B1* | 10/2019 | Tamersoy | G06F 21/566 |
| 10,885,393 B1* | 1/2021 | Sirianni | G06F 18/2411 |
| 2006/0037077 A1 | 2/2006 | Gadde et al. | |
| 2006/0242705 A1 | 10/2006 | Sadhasivam et al. | |
| 2007/0300301 A1 | 12/2007 | Cangini et al. | |
| 2013/0198840 A1 | 8/2013 | Drissi et al. | |
| 2017/0099312 A1* | 4/2017 | Ganame | G06N 20/00 |
| 2017/0220801 A1 | 8/2017 | Stockdale et al. | |
| 2018/0367553 A1* | 12/2018 | Hayden | H04L 63/1425 |

* cited by examiner

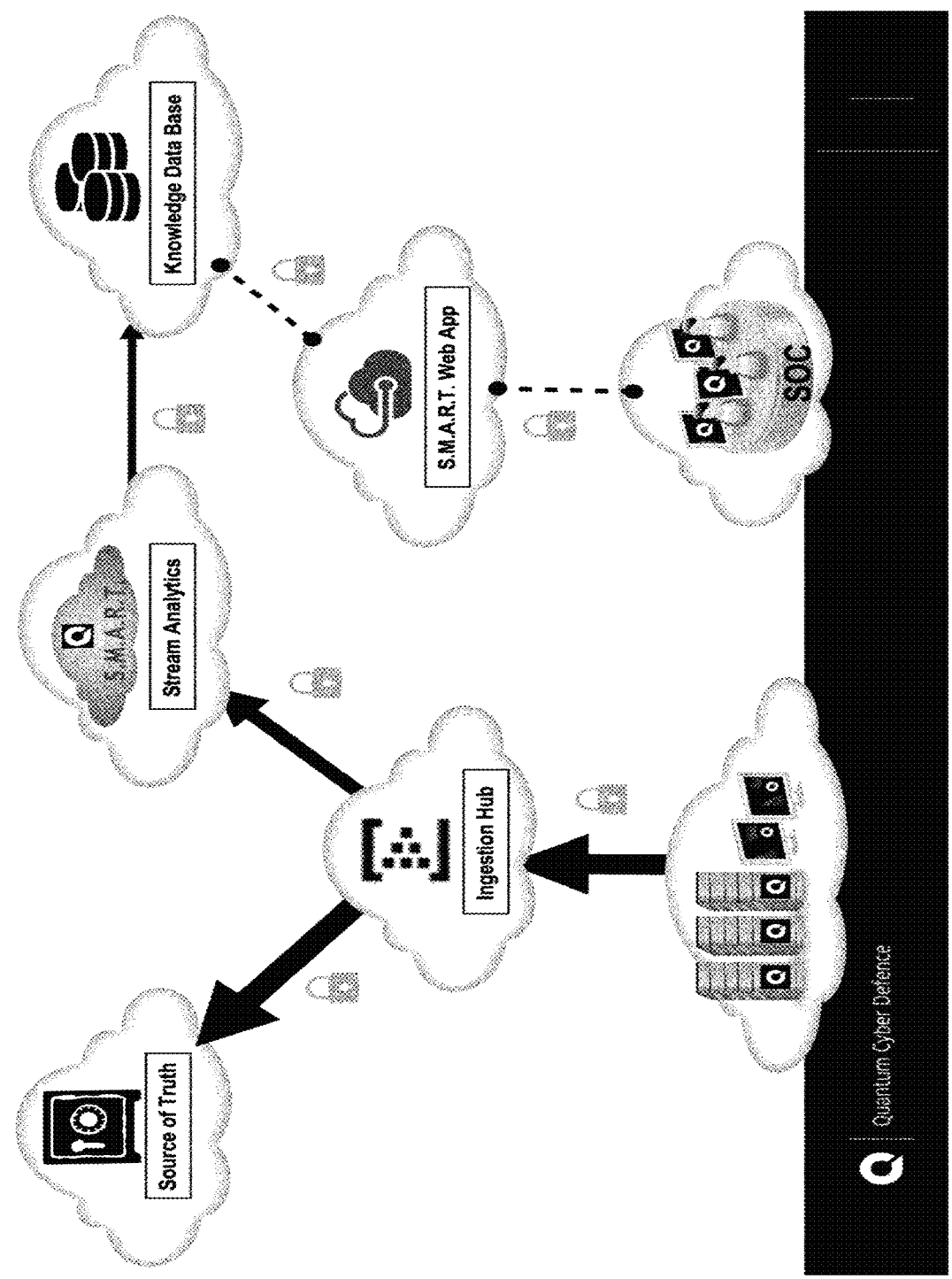

SYSTEMS AND METHOD OF CYBER-MONITORING WHICH UTILIZES A KNOWLEDGE DATABASE

RELATED APPLICATIONS

The present application is a United States National Phase under 35 U.S.C. § 371 of International Application No. PCT/CA2019/050958, filed on Jul. 12, 2019, which claims priority to, and the benefit of, U.S. Provisional Patent Application No. 62/699,868, filed on Jul. 18, 2018 and U.S. Provisional Patent Application No. 62/697,177, filed on Jul. 12, 2018, the entire contents of all of the foregoing applications are hereby incorporated by reference for all purposes.

FIELD OF THE INVENTION

The present invention pertains to the field of network monitoring. In particular, the present invention relates to systems and methods for network monitoring which utilizes knowledge databases.

BACKGROUND OF THE INVENTION

Computers and computer networks have become an integral part of modern society. As reliance on computers and computer networks has grown the impact of failure of computers and computer networks has also grown. Moreover, malicious cyber-events, including but not limited external cyber-attacks and internal security breaches are a major concern for both organizations and individuals which can result in significant damages. Immediate damages include but are not limited to data deletion and/or corruption, data theft, release of confidential information to the public, and/or system/network downtime. Subsequent damages include but are not limited to financial losses, social and/or political repercussion, business interruption, loss of competitive advantage and/or loss of intellectual property. Accordingly, monitoring of computers and computer networks is of significant importance.

SUMMARY OF THE INVENTION

The present invention provides systems and methods of cyber-monitoring which utilize a knowledge database. In accordance with an aspect of the present invention, there is provided a method of monitoring a cyber-network, the method comprising: providing one or more database(s) of normally-occurring cyber-event(s); detecting cyber-event(s) in the cyber-network; determining if the detected cyber-event(s) are normal or anomalous by comparing the detected cyber-event(s) to cyber-events in the one or more database(s) of normally-occurring cyber-events; excluding cyber-event(s) which are determined to be normally-occurring cyber-events to identify anomalous cyber-events; and optionally determining if the anomalous cyber-events are malicious.

In certain embodiments, at least one of the one or more database(s) is a database of normally-occurring cyber-vent(s) specific for a network or a node thereof. This database may be stored locally in the network or the node or remotely.

In certain embodiments, at least one of the one or more database(s) is a global database of normally-occurring cyber-event(s). In such embodiments, the global database comprises normally-occurring cyber-event(s) that are not specific to any particular unique network or node configuration. For example, generic operating system related cyber-events are global in nature while cyber-event(s) related to a custom web application is not global in nature. In one such embodiment, the global database can be generated through the generation of cyber-events in a controlled environment, such as a laboratory environment, and by only selecting cyber-events that are global in nature (e.g. representing generic behavior such as operating system updates).

In certain embodiments, the global database is stored remotely to the network or the node. For example, the global database may be stored in a cloud. In embodiments in which the monitored network is cloud-based, the global database may be in the same cloud as the network or in a separate cloud.

In certain embodiments, at least one of the database(s) is a database of normally-occurring cyber-event(s) specific for the network or a node thereof and at least one of the database(s) is a global database of normally-occurring cyber-event(s).

In certain embodiments, the method is a cloud-based method. In specific embodiments, the method is performed in a plurality of clouds, wherein each cloud has a database and is in communication with databases in other clouds.

In certain embodiment, the one or more databases evolve to update normally-occurring cyber-events.

In another aspect of the present invention, there is provided a method of developing and evolving a database of normally-occurring cyber-event(s), the method comprising: receiving input data representing normally-occurring cyber-event(s) in one or more network(s) or nodes thereof; generating a database of normally-occurring cyber-event(s); detecting cyber-event(s) in the in one or more network(s) or nodes thereof; determining if the detected cyber-event(s) are normal or anomalous by analyzing the detected cyber-event(s) using the database of normally-occurring cyber-events; and updating the database to add newly identified normal cyber-event(s) and/or delete cyber-events which have been determined to be anomalous.

In another aspect of the present invention, there is provided a knowledge based system for cyber monitoring, the system comprising a base set of data from monitored assets, a means for processing data from the monitored assets, a means for dispatching data from the monitored assets, and a database of normally-occurring cyber-event(s) for the monitored assets.

BRIEF DESCRIPTION OF THE FIGURES

FIG. 1 illustrates an embodiment of the system of the present invention.

DEFINITIONS

An activity (also referred to as a cyber-activity), as used herein, is an action that can be linked to one or multiple cyber-events in a knowledge database. Non-limiting examples of activities include the execution of a program, the logging in of user, a communication to the Internet, the change of an operating system configuration parameter, among others. These activities can be represented by a set of values related to underlying event parameters such as process name, user SID, USB key serial number, module library dll name, among others.

DETAILED DESCRIPTION

The present invention provides systems and methods which utilize one or more knowledge database(s) to classify cyber-events or activities. The classification may be used to determine if a cyber-event or cyber-events are normal or anomalous.

Accordingly, in certain embodiments there is provided a method of monitoring a cyber-network, the method comprising: providing one or more database(s) of normally-occurring cyber-event(s); detecting cyber-event(s) in the cyber-network; classifying the detected cyber-event(s) into a category of normally-occurring or as anomalous by analyzing the detected cyber-event(s) using the one or more database(s) of normally-occurring cyber-events; excluding cyber-event(s) which are classified as normally-occurring to identify anomalous cyber-events. Optionally, the method further comprises determining if the anomalous cyber-events are malicious. Optionally, all anomalous cyber-events, a portion thereof, such as anomalous cyber-events which are identified as malicious trigger downstream activities. Such downstream activities may include a notification being sent or initiation of countermeasures.

The one or more databases comprise a listing of normally occurring cyber-events. Cyber-events may include but are not limited to cyber-events ranging from a change to a registry key to the execution of a program to a user logging, among others. The database(s) may be stored locally in the monitored network or node thereof or stored in a location remote to the monitored network or node thereof.

In certain embodiments, the database is cloud based. In certain embodiments, method is performed in a plurality of clouds, wherein each cloud has a database and is in communication with databases on other clouds.

The database may present cyber-event(s) over various scales. For example, the database may be a local database representing normal local cyber-event(s). For example, normal cyber-event(s) for a single network or node thereof. Alternatively, the knowledge database may represent normal cyber-event(s) and/or activities on a larger scale (i.e. a global knowledge database). For example, the database may represent normal cyber-event(s) and/or activities for multiple network(s) or multiple nodes in a network thereof. Accordingly, the method of cyber-monitoring may utilize a single database of normally-occurring cyber-event(s) specific for the monitored network or a node thereof or a single global database of normally occurring cyber-events. Alternatively, the method may utilize both local and global databases.

The database may be time dependent (e.g. a database may evolve over time because of changes to the operating system including patches and updates); environment specific (e.g., different devices such as workstations and mobile devices may have different databases); and/or context aware (e.g. a database may be reflect user behaviors). As an illustrative example, the expected cyber-activities of a user in the human resources (HR) department will be different to the expected cyber-activities of a user in the information technology (IT) department and as such the databases associated with different users will be different). Accordingly, in certain embodiments, each database is uniquely generated.

In certain embodiments, the knowledge databases are fully or partially populated by cyber-events obtained from a controlled environment, such as a laboratory environment. In certain embodiments, the databases are comprised fully or partially populated by cyber-events obtained from a monitored environment, where the determination of whether a new cyber-event is normal utilizes context specific knowledge (i.e. information to the specific network and/or node). In certain embodiments, the knowledge databases are fully or partially populated by cyber-events determined to be normal from knowledge in the art regarding normal cyber-events; this knowledge can be generic or specific to a particular network(s) and/or node(s).

In certain embodiments, the database evolves to update normally-occurring cyber-events. As used herein the term update includes but is not limited to add, delete and modify cyber-events. In specific embodiments, this evolution may be in order to capture user context specific behavioral changes that are legitimate. For example, the database may evolve in response to legitimate modifications to the operating system (OS) and/or applications/programs resulting from updates, hotfixes and patches.

In certain embodiments, one or more of the underlying activity or activities can be selected for a given cyber-event or cyber-events to compare with existing cyber-events in the knowledge database to determine whether it is known to one or more knowledge databases (i.e. that the underlying activity or activities are contained in a knowledge database), and hence normally occurring and thus not anomalous. Each of the underlying activities can be represented by one or more parameter types and one or more values.

In certain embodiments, the classification method utilizes aggregation to group together individual cyber-events into related groups, using one or more "pivot" parameters to group together related cyber-events and their underlying activities. The aggregated cyber-events can be used to create a group of normal activities for similar events. Pivot parameters may include, but are not limited to, program image name or a file hash.

For example, cyber-events related to individual user behavior can be grouped together using the "logon session identifier" as a pivot to create a grouping for the underlying user activities. User activities can include but is not limited interactively logging into a workstation or server, or remotely logging into a workstation or server. The aggregation of cyber-events, first at the individual logon session level, can be furthered by aggregated using the individual username as a new "higher level" pivot. This higher-level aggregation can be used to define a normal behavior for the individual user from which future activity will be defined as normal or anomalous based on the past behavior.

Accordingly, in some embodiments, the knowledge database groups normal activity behavior or the cyber-event(s) in the knowledge database may be grouped around one or more pivot parameters. In certain embodiments, a local knowledge database is utilized. A worker skilled in the art would readily appreciate that a normal cyber-event may be in one or more groups of normal behavior because different activities based on pivot parameter(s).

Accordingly, in certain embodiments, the method comprises grouping the known cyber-events in the one or more knowledge databases around one or more pivot parameters.

To determine whether a new single cyber-event or cyber-events aggregated using a logon session identifier as a pivot are normal or anomalous with respect to the knowledge databases, methods that use the underlying activities are utilized to make that determination. For example, if the user performed a remote logging into a workstation and if such an activity (i.e. remote-logging-workstation) is not an activity contained in the knowledge database then all the cyber-events related to this underlying activity is determined to be anomalous. The selection of the activities used to classify cyber-event(s) as normal or anomalous can also include different levels of granularity such as the exact device and not just the device type (i.e. workstation, server, laptop, etc.), among others. For example, a very granular activity representation can be created where the underlying activity representing normal cyber-events is described as follows:

remote-logging-WS001, where WS001 represents a specific workstation. As a consequence of selecting this level of granularity the number cyber-events that will be classified as normal will be significantly reduced.

In certain embodiments, the aggregation method above can also be used for the classification of cyber-events as related to the execution of programs, as another example. For example, the aggregation of process execution using a unique process identifier (i.e. process guide) enables a first level of aggregation. This can be furthered aggregated using one or multiple "pivot" parameters such as program image name or file hash, among others. All the cyber-events containing the selected "pivot" directly or indirectly through a pivot parameter indirectly are aggregated in order to form a unique set of underlying activities. Once again the underlying activities represented by each of the aggregated cyber-events can be used to implement methods for comparing new cyber-events to those contained in the knowledge databases.

In certain embodiments of the present invention, there is provided a method of developing and evolving a database of normally-occurring cyber-event(s), the method comprising: receiving input data representing normally-occurring cyber-event(s) in one or more network(s) or nodes thereof; generating a database of normally-occurring cyber-event(s); detecting cyber-event(s) in the in one or more network(s) or nodes thereof; determining if the detected cyber-event(s) are normal or anomalous by comparing the detected cyber-event(s) to cyber-events in the database and optionally one or more other database(s) of normally-occurring cyber-events; and updating the database to add newly identified normal cyber-event(s) and/or delete cyber-events which have been determined to be anomalous. The evolution may be an automatic process or in response to user input. The evolution may be continuous, periodic (e.g. at regularly scheduled intervals or in response to any changes).

Cyber-events may be detected by a plurality of sensors, agents, event-logs, forensic techniques or any combination thereof. In certain embodiments, sensor(s) and/or agents are used to detect cyber-events. Optionally, in specific embodiments, the sensors and/or agents form a meshed network which monitors cyber-events. In certain embodiments, the network is self-healing. The sensors and/or agents may be deployed at the host/node and/or network level. Visibility/sensitivity of the network may be increased by deploying new sensors and/or agents and/or increasing the sensitivity of existing sensors and/or agents. For example, when a network is actively under attack by an adversary the cyber defence team may wish to increase the visibility/sensitivity of the monitoring system by deploying additional sensors or increasing the sensitivity of existing sensors to report back a greater level of information. In certain embodiments, all cyber-events are detected. In other embodiments, a portion of cyber-events are detected. The level of detecting be adjusted, either automatically or in response to an action by a user. For example, when a network is actively under attack the level of detecting may be increased.

The method of the present invention utilizes one or more databases to identify cyber-events as normal-occurring and exclude the normal-occurring events from further analysis. Accordingly, the method of the present invention reduces the number of cyber-events which require further analysis. Optionally, the method further comprises sending a notification or tagging cyber-events which were identified as anomalous for further analysis. Methods of analysis are known in the art. In certain embodiments, the further analysis is by a human operator. In certain embodiments, the further analysis is digital. In specific embodiments, the further analysis utilizes artificial intelligence.

In certain embodiments, the further analysis occurs automatically. The further analysis may comprise a determination of whether the anomalous cyber-events are malicious.

In certain embodiments, the method initiates countermeasures against any malicious cyber-events. In specific embodiments, an automated active response that utilizes pre-authorized client approved measures to mitigate possible on-going cyber-attacks is triggered by context specific conditions.

An embodiment of the system of the present invention is set forth in FIG. 1. In particular, FIG. 1 illustrates a knowledge-based system for cyber monitoring. In this embodiment, the knowledge-based system for cyber monitoring comprises a base set of data from monitored assets, a means for processing data from said monitored assets, a means for dispatching data from the monitored assets, and a database of normally-occurring cyber-event(s) for the monitored assets.

Referring to FIG. 1, the "source of truth" represents the base set of "clean data" from the monitored assets. This base set preserves the information contained in the original raw data [e.g. event logs] collected. The "Streaming Analytics" (i.e. means for processing data from the monitored assets) processes the "clean data" or "raw data", depending on the use case, such that layered detection rules are applied in view of aggregating, structuring and scoring a continuous flow of 'events' in both a stateless and stateful manner. The "ingestion hub" (i.e. means for dispatching data from monitored assets) enables the dispatching of raw data from monitored assets into different flows, such that—for example—"clean data" can be stored in one of many types of storage containers [e.g. Blob Storage], and deterministic processing can be applied to the raw data such that it preserves the information contained in the raw data ingested. The "Knowledge Data Base" contains processed information related to the normal behavior of an IT environment, history of Alerts both processed and unprocessed, such that the processing performed by a human operator is captured, machine learning models, and metadata, data enrichment and statistics on streamed data.

The invention claimed is:

1. A method of monitoring a cyber-network, the method comprising:
   providing one or more database(s) of normally-occurring cyber-event(s);
   detecting cyber-event(s) in the cyber-network;
   comparing the detected cyber-event(s) to the normally-occurring cyber-event(s) in the one or more database(s) of normally-occurring cyber-events;
   classifying the detected cyber-event(s) as normally-occurring if there is corresponding normally-occurring cyber-event(s) in the one or more database(s);
   excluding cyber-event(s) which are classified as normally-occurring from further analysis, wherein remaining cyber-event(s) are anomalous cyber-events; and
   automatically determining if the anomalous cyber-events are malicious.

2. The method of claim 1, wherein the one or more normally-occurring cyber-events have been classified into a category selected from the group consisting of: 1) operating system (OS) activities; 2) generic commercial applications activities; 3) industry specific applications activities; and 4) organizational specific application activities; wherein if said detected cyber-events corresponds to categories 1) to 4), said cyber-event is normal.

3. The method of claim 2, wherein a cyber-event is classified as operating system (OS) activities if it is a program execution seen across all organizations but limited to specific types of OS.

4. The method of claim 2, wherein cyber-event is classified as industry specific applications activities if it is a program execution only seen across organizations within a specific industry.

5. The method of claim 1, the classifying step further comprises sending requests for information or input and analyzing any information received.

6. The method of claim 1, wherein the classifying step comprises grouping detected cyber-events and comparing to groups of known cyber-events in said one or more databases; wherein if there is no corresponding group in said known groups, said grouping of detected cyber-events is anomalous.

7. The method of claim 1, wherein at least one of the one or more database(s) is a database of normally-occurring cyber-event(s) specific for the network or a node thereof.

8. The method of claim 7, wherein the database of normally-occurring cyber-event(s) specific for the network or the node thereof is stored locally in the network or the node thereof.

9. The method of claim 7, wherein the database of normally-occurring cyber-event(s) specific for the network or the node thereof is stored remotely to the network or the node thereof.

10. The method of claim 1, wherein at least one of the one or more database(s) is a global database of normally-occurring cyber-event(s).

11. The method of claim 10, wherein the global database comprises normally-occurring cyber-event(s) specific for the network or the node thereof and other known normally-occurring cyber-event(s).

12. The method of claim 11, wherein the other known normally-occurring cyber-event(s) are normally-occurring cyber events in one or more other monitored network(s) or one or more other monitored node(s).

13. The method of claim 10, wherein the global database is stored remotely to the network or the node thereof.

14. The method of claim 1, wherein at least one of the one or more database(s) is a database of normally-occurring cyber-event(s) specific for the network or a node thereof and at least one of the one or more database(s) is a global database of normally-occurring cyber-event(s).

15. The method of claim 1, wherein the method is a cloud-based method.

16. The method of claim 15, wherein the method is performed in a plurality of clouds, wherein each cloud has a database and is in communication with database on other clouds.

17. The method of claim 1, wherein each of the one or more databases evolves to update normally-occurring cyber-events.

* * * * *